United States Patent
Kuroki (12)

(10) Patent No.: US 6,438,454 B1
(45) Date of Patent: Aug. 20, 2002

(54) ROBOT FAILURE DIAGNOSING SYSTEM

(75) Inventor: Yoshihiro Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/722,163

(22) Filed: Nov. 24, 2000

(30) Foreign Application Priority Data

Nov. 25, 1999 (JP) .......................................... 11-334504

(51) Int. Cl.$^7$ .............................................. G06F 19/00
(52) U.S. Cl. ........................ 700/245; 700/95; 700/108; 700/109; 700/110; 700/163; 700/186; 700/193; 702/712; 701/23; 901/23; 901/29
(58) Field of Search ........................ 700/245, 95, 193, 700/186, 195, 163, 71, 175, 108–110, 79, 83, 86, 87; 702/84; 29/712; 250/379, 250; 409/201, 216; 901/23, 29; 356/634; 701/23

(56) References Cited

U.S. PATENT DOCUMENTS

| | | | | |
|---|---|---|---|---|
| 4,213,183 A | * | 7/1980 | Barron et al. ................ | 345/354 |
| 4,718,023 A | * | 1/1988 | Arora .......................... | 706/59 |
| 5,271,686 A | * | 12/1993 | Herring, Jr. et al. ........ | 600/595 |
| 5,425,133 A | * | 6/1995 | Yasuhara et al. ............ | 345/156 |
| 5,980,187 A | * | 11/1999 | Verhovsky ................... | 434/262 |
| 2001/0032278 A1 | * | 10/2001 | Brown et al. ................ | 700/260 |

FOREIGN PATENT DOCUMENTS

EP  1 103 451 A2 * 5/2001

OTHER PUBLICATIONS

Lam et al., Studies in knowledge–based diagnosis of failures in robotic assembly, 1990, IEEE, pp. 60–65.*
Valavanis et al., An application of teh 4–parameter controller to the robot payload, 1989, IEEE, pp. 244–250.*
Seetharaman et al., Diagnostic intelligence mechanisms for multisensory robotic system, 1991, IEEE, pp. 1889–1890.*
Patent Abstracts of Japan, vol. 016, No. 225, May 26, 1992, JP 04 047412.
Patent Abstracts of Japan, vol. 017, No. 433, Aug. 11, 1993, JP 05 096488.
Patent Abstracts of Japan, vol. 1997, No. 11, Nov. 28, 1997, JP 09 174482.

* cited by examiner

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer

(57) ABSTRACT

A robot failure diagnosing system in which sound input by the user is interpreted/recognized by a command recognizing section in order to notify a request for a diagnosis to a self-diagnosis section. For example, the user can input a command which prompts a self-diagnosis operation in the form of a natural communication, such as by saying, "Perform a self-diagnosis operation," and by asking, "How do you feel, robot?" With respect to this, the robot can indicate the self-diagnosis result in the form of a natural conversation, such as by saying, "I'm not feeling well," "My leg hurts," and "I'm hungry." The robot failure diagnosing system performs a self-diagnosis of a failure or abnormality in a system, and feeds back the diagnosis result to the user.

13 Claims, 6 Drawing Sheets

100
(DEGREE-OF-FREEDOM
STRUCTURE MODEL)

US 6,438,454 B1

ROBOT FAILURE DIAGNOSING SYSTEM

BACKGROUND OF THE INVENTION

1. Field of the Invention

The present invention relates to a realistic robot which is constructed as a result of modeling the operation and mechanism of a living body, and, more particularly, to a movable robot in which the mechanism of the body of a leg-movement-type animal, such as a human being and a monkey, is modeled.

Even more particularly, the present invention relates to a leg-movement-type-robot controlling system which can independently perform an actuating operation as a result of installing a controlling device thereat. Still more particularly, the present invention relates to a leg-movement-type robot controlling system which executes a self-diagnosis of failures or abnormalities in the system, and which can feed back the diagnosis results to the user.

2. Description of the Related Art

The term robot is said to be derived from the Slavic word ROBOTA (slavish machine). In our country, the use of robots began from the end of the 1960s, many of which were industrial robots, such as manipulators and conveyance robots, used, for example, for the purpose of achieving automatic industrial operations in factories without humans in attendance.

In recent years, progress has been made in the research and development of leg-movement-type robots which emulate the movements and mechanisms of the body of an animal, such as a human being or a monkey, which walks on two feet while in an erect posture, so that there is a higher expectation of putting them into practical use. The posture and walking of leg-movement types which walk on two feet while in an erect posture are more unstable than those of crawler types or types having four or six legs so that they are more difficult to control. However, they are excellent in that they can move and work flexibly. More specifically, leg-movement-type robots which walk on two feet are suited for walking along unleveled surfaces, working paths having obstacles, and floors having uneven surfaces, and walking along walking surfaces which are not continuous, so that they can, for example, go up and down steps and ladders.

Leg-movement-type robots which emulate the mechanisms and movements of living bodies are called humanoid robots. The significance of carrying out research and development on leg-movement-type robots which are called humanoid robots can be understood from, for example, the following two viewpoints.

The first viewpoint is related to human science. More specifically, through the process of making a robot whose structure is similar to a structure having lower limbs and/or upper limbs of human beings, thinking up a method of controlling the same, and simulating the walking of a human being, the mechanism of the natural movement of a human being, such as walking, can be ergonomically understood. The results of such research can considerably contribute to the development of other various research fields which treat human movement mechanisms, such as ergonomics, rehabilitation engineering, and sports science.

The other viewpoint is related to the development of robots as partners of human beings which help them in life, that is, help them in various human activities in living environments and in various circumstances in everyday life. Functionally, in various aspects of the living environment of human beings, these robots need to be further developed by learning methods of adapting to environments and acting in accordance with human beings which have different personalities and characters while being taught by human beings. Here, it is believed that making the form and structure of a robot the same as those of a human being is effective for smooth communication between human beings and robots.

For example, when teaching to a robot a way of passing through a room by avoiding obstacles which should not be stepped on, it is much easier for the user (worker) to teach it to a walking-on-two-feet-type robot which has the same form as the user than a crawler-type or a four-feet-type robot having structures which are completely different from the structure of the user. In this case, it must also be easier for the robot to learn it. (Refer to, for example, Controlling a Robot Which Walks On Two Feet" by Takanishi (Jidosha Gijutsukai Kanto Shibu <Koso> No. 25, Apr., 1996.)

The working space and living space of human beings are formed in accordance with the behavioral mode and the mechanism of the body of a human being which walks on two feet while in an upright posture. In other words, for moving present mechanical systems using wheels or other such driving devices as moving means, the living space of human beings has many obstacles. However, it is preferable that the movable range of the robot be about the same as that of human beings in order for the mechanical system, that is, the robot to carry out various human tasks in place of them or to help them carry out various human tasks, and to deeply penetrate the living space of human beings. This is the reason why there are great expectations for putting a leg-movement-type robot into practical use. In order to enhance the affinity of the robot to the living environment of human beings, it is essential for the robot to possess a human form.

One application of humanoid robots is to make them carry out various difficult operations, such as in industrial tasks or production work, in place of human beings. They carry out in place of human beings dangerous or difficult operations, such as maintenance work at nuclear power plants, thermal power plants, or petrochemical plants, parts transportation/assembly operations in manufacturing plants, cleaning of tall buildings, and rescuing of people at places where there is a fire, and the like.

Another application of the humanoid robot is related to the living together in the same living space as human beings, that is, to entertainment. In this type of application, the robot is deeply characterized as being closely connected to life rather than as helping human beings in life by, for example, performing tasks in place of them.

For entertainment robots, the production of an operation pattern, itself, which is executed during the operation is a theme regarding the research and development thereof rather than the constructing of them so that they can be industrially used as specified with high speed and high precision. In other words, it is preferable that the whole body harmoniously moving type operation mechanism which an animal, such as human beings and monkeys, which walk on two feet while in an erect posture actually possess be faithfully reproduced in order to achieve smooth and natural movement. In addition, in emulating highly intelligent animals, such as human beings or monkeys, which stand in an upright posture, it is to be considered that the use of an operation pattern which uses the four limbs is natural as a living body, and it is desirable that the movements are sufficiently indicative of emotions and feelings.

Entertainment robots are required not only to faithfully execute a previously input operation pattern, but also to act vividly in response to the words and actions of a person (such as speaking highly of someone, scolding someone, or hitting someone). In this sense, entertainment robots which emulate human beings are rightly called humanoid robots.

In conventional toy machines, the relationship between the operations which are carried out by the user and the responding operation is fixed/standardized, so that the same operations are merely repeated, causing the user to eventually get tired of the toy machines. In contrast, entertainment robots, though they execute operations in accordance with an operation generation time series model, can change this time series model, that is, impart a learning effect, in response to a detection of an external stimulus which is produced by, for example, the operation of the user. Therefore, the relationship between the operations which are carried out by the user and the responding operation is programmable, making it possible to provide an operation pattern which does not make the user tired of it or which conforms to the tastes of the user. In addition, by operating the robot, the user can enjoy a type of educational simulation.

The working space of a movable robot is not limited. The robot moves along a predetermined path or a pathless place in order to perform predetermined or any tasks in place of human beings or to provide various other services in place of human beings, dogs, or other living beings.

So long as the movable robot is an industrial product, it must be provided with as little failures and abnormalities as possible to the user. However, it cannot be guaranteed that all of the products to be shipped will be free from abnormalities. In addition, by repeated use by the user, parts wear and deteriorate with the passage of time, so that failures inevitably occur in the products. Further, in a leg-movement-robot which is required to perform complicated posture control operations, abnormal processing of the system may be expected to occur during the repeated execution of thinking controlling and movement controlling operations.

When a failure or abnormality occurs in the product, the user needs to perform maintenance operations, such as repairing operations. Here, it is convenient when an independently actuating type robot diagnoses the failure or tells the location of the failure to the user in response to a command which is given by the user or based on its own intention. In particular, the humanoid robot includes an excellent user interface which functions like a human being, so that one can expect the robot to receive a failure diagnosis command when the user very naturally communicates with the robot, and to tell the diagnosis results to the user by a human-like action and in an easily understandable manner.

In the case of a movable robot, failures or abnormalities in the system may cause secondary disasters such as the robot running into the user (or worker) when it moves wildly. Therefore, it is preferable that the robot independently tell the user at an early stage that a failure or an abnormality has occurred.

SUMMARY OF THE INVENTION

It is an object of the present invention to provide an excellent controlling system of a leg-movement-type robot which can independently perform an actuating operation as a result of installing a controlling device thereat.

It is another object of the present invention to provide an excellent controlling system of a leg-movement-type robot which can perform a self-diagnosis operation of a failure or an abnormality in the system, and which can feed back the diagnosis results to the user.

It is still another object of the present invention to provide a humanoid robot which receives a failure diagnosis command through an excellent, "human-like" user interface, and which can tell the diagnosis results in an easily understandable manner to the user.

It is still another object of the present invention to provide a movable robot which can independently tell at an early stage that a failure or abnormality has occurred.

To these ends, according to the present invention, there is provided a robot failure diagnosing system which comprises a plurality of joint actuators. The system further comprises request input means for inputting a request for a failure diagnosis thereto, measuring means for measuring the state of the inside of a robot, diagnosing means for diagnosing the failure of the robot in response to the request for a failure diagnosis which has been input to the request input means, and diagnosis result outputting means for outputting a failure diagnosis result given by the diagnosing means to anything outside the system.

In the robot failure diagnosing system, the request input means may receive the request through sound, or from an external system through a communications interface.

In the robot failure diagnosing system, the measuring means may include an encoder for measuring the angle of each joint actuator, and the diagnosing means may diagnose the failure based on a deviation of each current joint angle output from the encoder from a corresponding target joint angle which is prescribed with respect to each joint actuator.

In the robot failure diagnosing system, the measuring means may include a temperature sensor for measuring the temperature of the inside of each joint actuator, and the diagnosing means may determine that a failure has occurred in each joint actuator when each temperature measured by the temperature sensor exceeds a corresponding prescribed value.

In the robot failure diagnosing system, the robot may be a battery-actuating-type robot. In this case, the measuring means may include a supply voltage detecting section for measuring a terminal voltage of a battery or the supply voltage supplied to each section from the battery. In addition, the diagnosing means may determine that a power supply abnormality has occurred when the voltage detected by the supply voltage detecting section falls outside a corresponding prescribed value.

In the robot failure diagnosing system, the measuring means may include a posture sensor for detecting the azimuthal angle of at least one of a pitch axis, a roll axis, and a yaw axis of the robot, and the diagnosing means may determine that an abnormal posture has occurred when the azimuthal angle detected by the posture sensor falls outside a corresponding prescribed value.

In the robot failure diagnosing system, the measuring means may include an image input device, and the diagnosing means may perform a diagnosis based on a result which has been recognized from an input image which is provided at the image input means.

In the robot failure diagnosing system, the measuring means may include an image input device, and the diagnosing means may perform a diagnosis based on a piece of object-related information which has been recognized from an input image which is provided at the image input means.

In the robot failure diagnosing system, the measuring means may include an image input device, and the diagnosing means may perform a diagnosis based on a piece of color information which has been recognized from an input image which is provided at the image input means.

In the robot failure diagnosing system, the measuring means may include at least one of a contact sensor and a power sensor, and the diagnosing means may determine that an abnormality has occurred when the output of either the contact sensor or the power sensor exceeds a prescribed value corresponding thereto.

In the robot failure diagnosing system, the diagnosis result outputting means may output the diagnosis result using sound.

In the robot failure diagnosing system, the diagnosis result outputting means may output the diagnosis result to an external system through a communications interface.

The robot of the present invention can perform a self-diagnosis operation of, for example, a failure or an abnormality in the system, and can feed back the diagnosis results to the user.

The robot of the present invention can receive a request for a diagnosis by a sound input through a sound input device which corresponds to the sense of hearing of a human being, and express the diagnosis results through a sound output. In other words, the robot receives a failure diagnosis command through a "human-like" user interface which it actually incorporates, and tells about the diagnosis results in an easily understandable manner to the user.

Other objects, features, and advantages of the present invention will become manifest from a more detailed description with reference to an embodiment of the present invention described below and the attached drawings.

DESCRIPTION OF THE PREFERRED EMBODIMENT

Hereunder, a description of an embodiment of the present invention will be given in detail with reference to the drawings.

Figure 1:
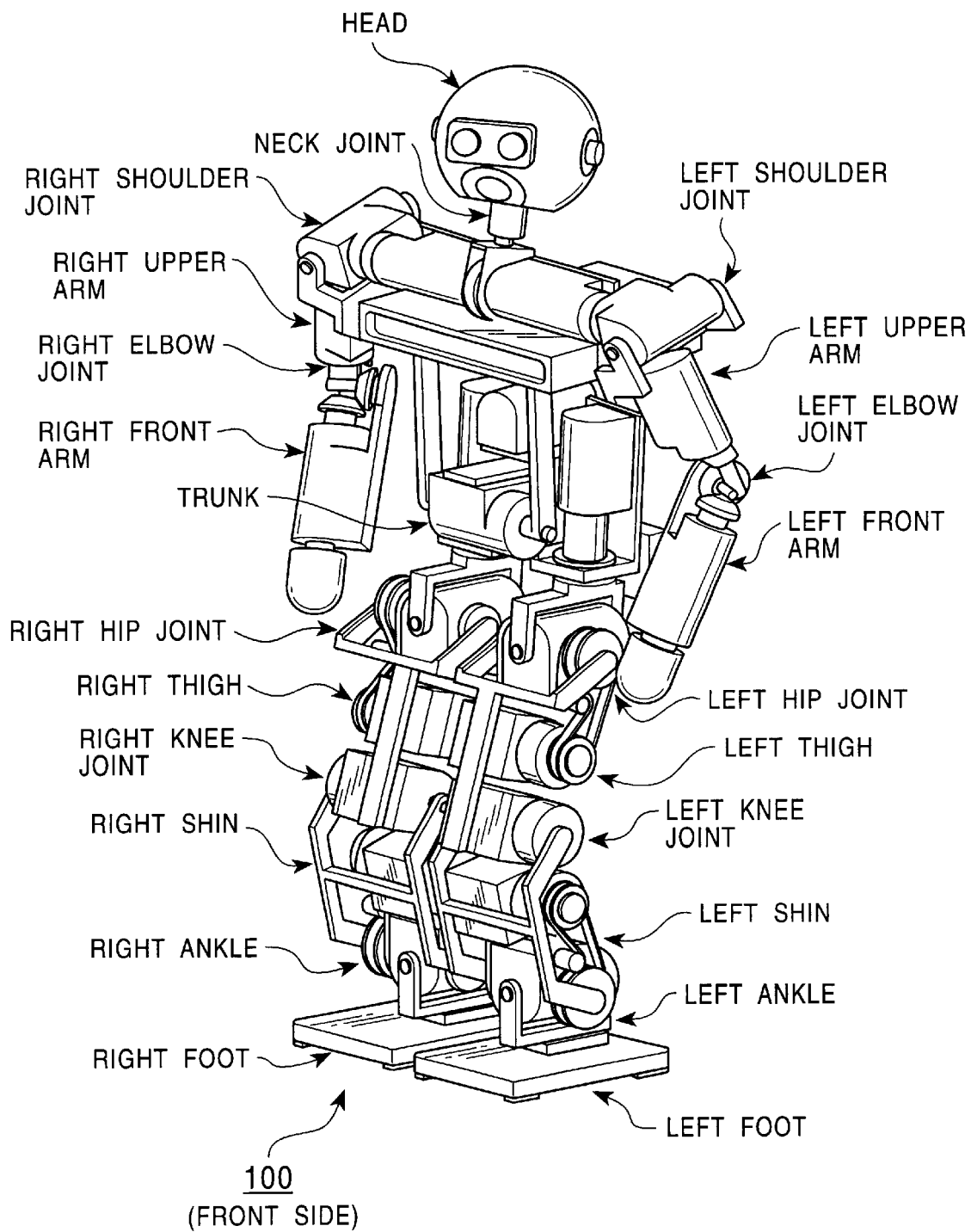
FIG. 1 is a front view showing a leg-movement-type robot 100 of an embodiment of the present invention.
Figure 2:
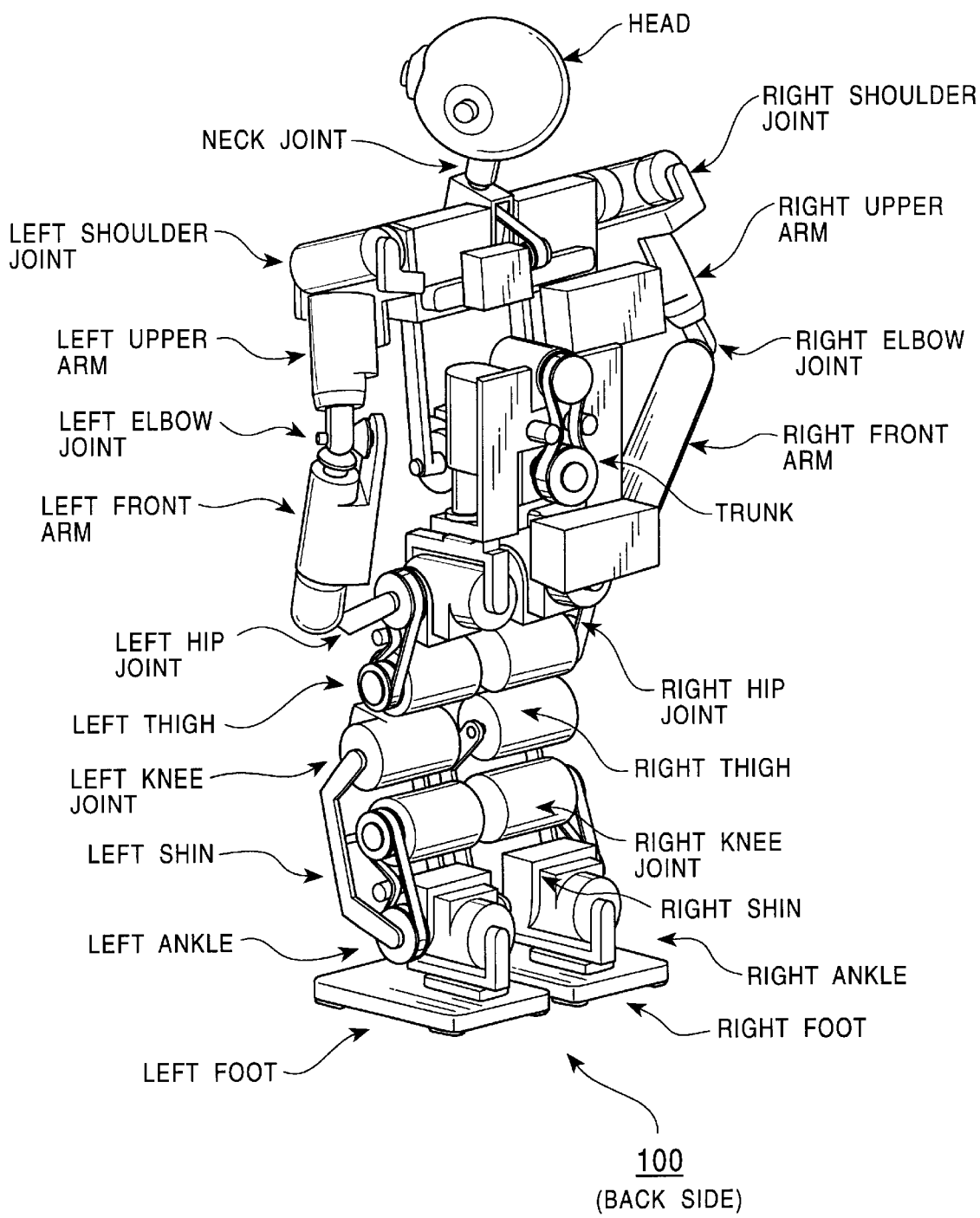
FIG. 2 is a back view of the leg-movement-type robot 100 of the embodiment of the present invention.

FIGS. 1 and 2 are front and back views showing a humanoid leg-movement-type robot 100 of an embodiment of the present invention standing in an upright position. As shown in the figures, the leg-movement-type robot 100 comprises left and right lower limbs used for movement, a trunk, left and right upper limbs, and a head.

The left and right lower limbs each comprise a thigh, knee joint, a shin, an ankle, and a foot. They are connected to substantially the bottom end of the trunk by corresponding hip joints. The left and right upper limbs each comprise an upper arm, an elbow joint, and a front arm. They are connected to their corresponding upper left and right side edges of the trunk by corresponding shoulder joints. The head is connected to substantially the uppermost end center portion of the trunk by a neck joint.

A control section (which cannot be seen in FIGS. 1 and 2) is disposed in a trunk unit. The control section is a housing in which are installed a controller (a main controlling section) for controlling the actuation of each joint actuator making up the leg-movement-type robot 100 and for processing externally input information from, for example, each sensor (described later), and peripheral devices such as a power supply circuit. The controlling section may also include a remote-control communications interface or a communications device. In the present invention, the place where the controlling section is disposed is not particularly limited.

Figure 3:
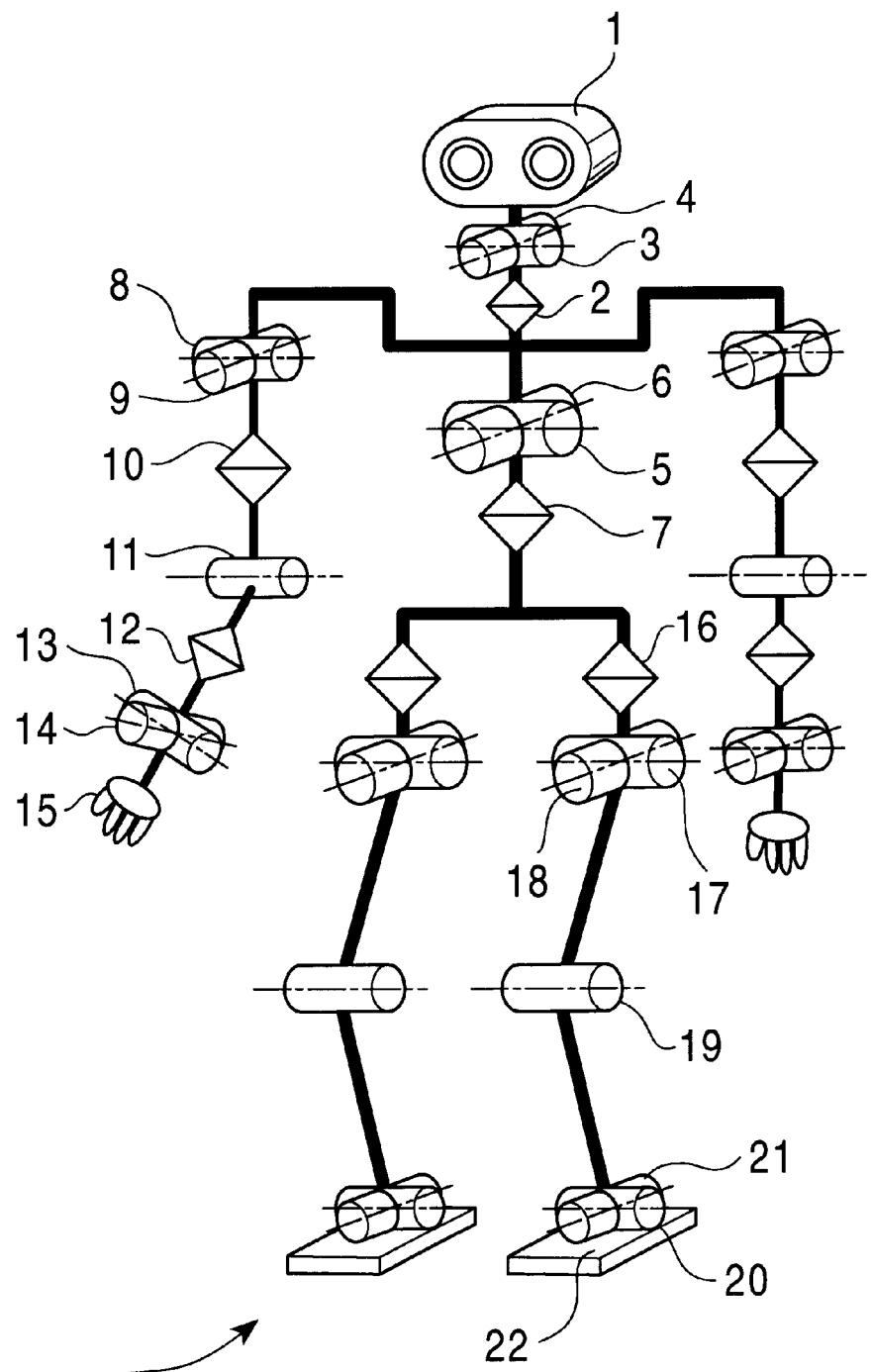
FIG. 3 is a schematic view of a degree-of-freedom structure model of the leg-movement-type robot 100 of the embodiment of the present invention.

FIG. 3 schematically illustrates a joint structure of the leg-movement-type robot 100, which provides the degrees of freedom thereof. As shown in the figure, the leg-movement-type robot 100 comprises an upper part of the body including two arms and a head 1, lower limbs or two legs used for movement, and a trunk which connects upper limbs and the lower limbs.

A neck joint which supports the head 1 possesses three degrees of freedom which are provided in correspondence with a neck joint yaw axis 2, a neck joint pitch axis 3, and a neck joint roll axis 4.

Each arm includes a shoulder joint pitch axis 8, a shoulder joint roll axis 9, an upper arm yaw axis 10, an elbow joint pitch axis 11, a front arm yaw axis 12, a wrist joint pitch axis 13, a wrist joint roll axis 14, and a hand 15. Each hand 15 is actually a structure including a plurality of fingers so as to have many joints and degrees of freedom. However, since the operation of each hand 15 itself rarely contributes to and influences the posture controlling and stable walking control operations of the robot 100, each hand in the embodiment is assumed to possess zero degrees of freedom. Therefore, each left and right arm possesses seven degrees of freedom.

The trunk possesses three degrees of freedom which are provided in correspondence with a trunk pitch axis 5, a trunk roll axis 6, and a trunk yaw axis 7.

The left and right legs comprising the lower limbs each include a hip joint yaw axis 16, a hip joint pitch axis 17, a hip joint roll axis 18, a knee joint pitch axis 19, an ankle joint pitch axis 20, a joint roll axis 21, and a foot (or a sole) 22. The points where the hip joint pitch axes 17 and their corresponding hip joint roll axes 18 intersect are defined as the locations of the hip joints of the robot 100 in the embodiment. The feet (or soles) of the human body are actually structures having many joints and degrees of freedom. However, the soles of the leg-movement-type robot 100 of the embodiment are assumed as having zero degrees of freedom. Therefore, each leg possesses six degrees of freedom.

To sum up, the total number of degrees of freedom of the leg-movement-type robot 100 of the embodiment is 3+7×2+3+6×2=32. However, the number of degrees of freedom of the leg-movement-type robot 100 is not necessarily limited to 32. It is obvious that the number of degrees of freedom, that is, the number of joints can be increased or decreased as necessary in accordance with, for example, the required specification and the limiting conditions in designing and manufacturing the robot.

Each degree of freedom of the above-described leg-movement-type robot 100 is actually provided using an actuator. To respond to the demands of approximating the form of the robot to the natural form of a human being by removing extra bulges from its external appearance, and of controlling the posture of an unstable structure for walking on two feet, it is preferable to use small and light actuators.

In the embodiment, there are used in the leg-movement-type robot 100 small AC servo actuators which are directly connected to gears and which incorporate in a motor unit a servo control system formed into a one-chip system. This type of AC servo actuator is disclosed in, for example, Japanese Patent Application No. 11-33386 which has already been assigned to the applicant.

Figure 4:
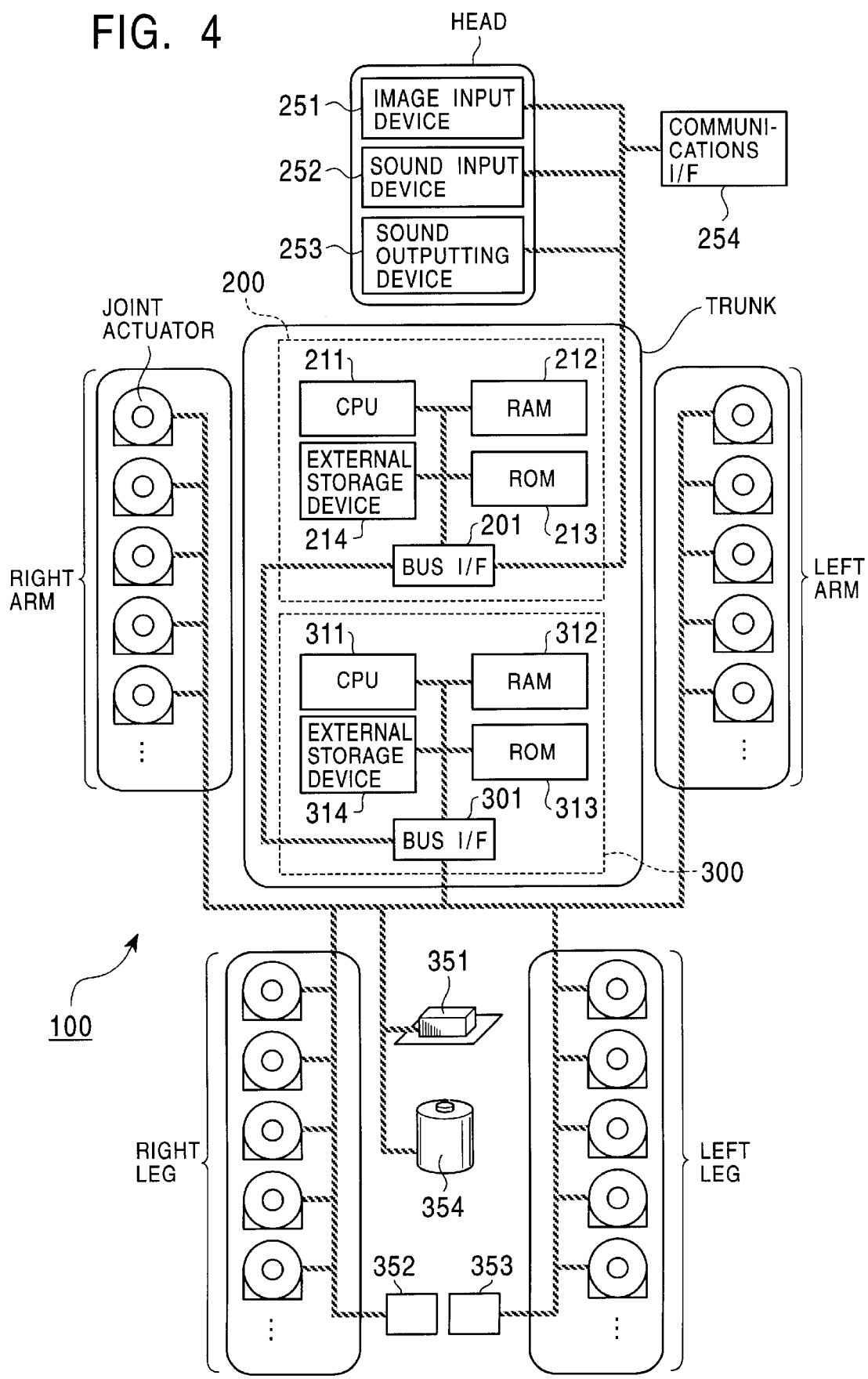
FIG. 4 is a schematic view of the structure of a controlling system of the leg-movement-type robot 100 of the embodiment of the present invention.

FIG. 4 is a schematic view of the structure of a controlling system of the leg-movement-type robot 100 of the embodiment of the present invention. In the figure, the system comprises a thinking controlling module 200 which expresses and determines emotions and feelings by dynamically reacting to, for example, the input operation performed by the user, and a movement controlling module 300 for controlling the harmonious movement of the whole body of the robot by, for example, actuating a joint actuator.

The thinking controlling module 200 is an information processing device which can independently perform a self-completing operation and which comprises a CPU (central processing unit) 211 for executing a computing operation regarding the expression and determination of feelings and emotions, RAM (random access memory) 212, ROM (read only memory) 213, and an external storage device (such as a hard disk drive) 214.

Through a bus interface 201, various devices such as a communications interface 254 which exchanges data with systems outside the robot 100 are connected to the thinking controlling module 200. The communications interface 254 performs the exchange of data through, for example, an image input device 251 serving as a visual sensor such as a CCD (charge coupled device) camera, a sound input device 252 serving as a hearing sensor such as a microphone, a sound outputting device 253 such as a speaker, and LAN (local area network) which is not shown.

At the thinking controlling module 200, the present feelings and intentions of the leg-movement-type robot 100 are determined in accordance with, for example, outside stimulus, such as the input of visual data from the image input device 251 or the input of hearing data from the sound input device 252. In addition, a command is issued to the movement controlling module 300 so that the robot acts, that is, moves using the four limbs, based on the decision made.

On the other hand, the movement controlling module 300 is a separate information processor for performing a self-completing operation. It comprises a CPU (central processing unit) 311 for controlling the harmonious movement of the whole body of the robot 100, RAM (random access memory) 312, ROM (read only memory) 313, and an external storage device (such as a hard disk drive) 314.

Through a bus interface 301, the movement controlling module 300 has connected thereto various devices such as joint actuators for providing degrees of freedom at the joints (see FIG. 3) which are spread throughout the whole body, a posture sensor 351 for measuring the posture and inclination of the trunk, floor contact confirmation sensors 352 and 353 for detecting the contacting of and moving off of the soles of the left foot and right foot with and from the floor, and a power supply controller for controlling the power supply such as battery used for actuation.

The CPU 311 of the movement controlling module 300 controls the harmonious movement of the whole body by each of the joint actuators while realizing the action commanded by the thinking controlling module 200.

In other words, the CPU 311 takes out an operation pattern in accordance with the action commanded by the thinking controlling module 200 from the external storage device 314 or internally generates an operation pattern. In accordance with the specified operation pattern, the CPU 311 sets, for example, the movement of the feet, the path of the ZMP (zero moment point), the movement of the trunk, the movement of the upper limbs, the horizontal position and height of the waist, etc., and sends a command value for executing the operation pattern in accordance with the details of these settings to each of the joint actuators.

By detecting the tilting and posture of the trunk of the robot 100 by the output signal of the posture sensor 351 and by detecting whether each movable leg is either in a "swinging state" or a "standing state" by an output signal of each of the floor contact confirmation sensors 352 and 353, the CPU 311 can appropriately control the harmonious movement of the whole body of the leg-movement-type robot 100.

The movement controlling module 300 returns information concerning how far the robot has acted in accordance with the decision made at the thinking controlling module 200, that is, in accordance with the information concerning the processing state, to the thinking controlling module 200.

The ZMP in the specification is the point on the floor surface where the moment resulting from the floor reaction force when the robot walks is zero. The ZMP path refers to the path of movement of the ZMP when, for example, the robot 100 is walking.

The thinking controlling module 200 and the movement controlling module 300 are constructed on a common platform, and are connected together through the bus interfaces 201 and 301.

Figure 5:
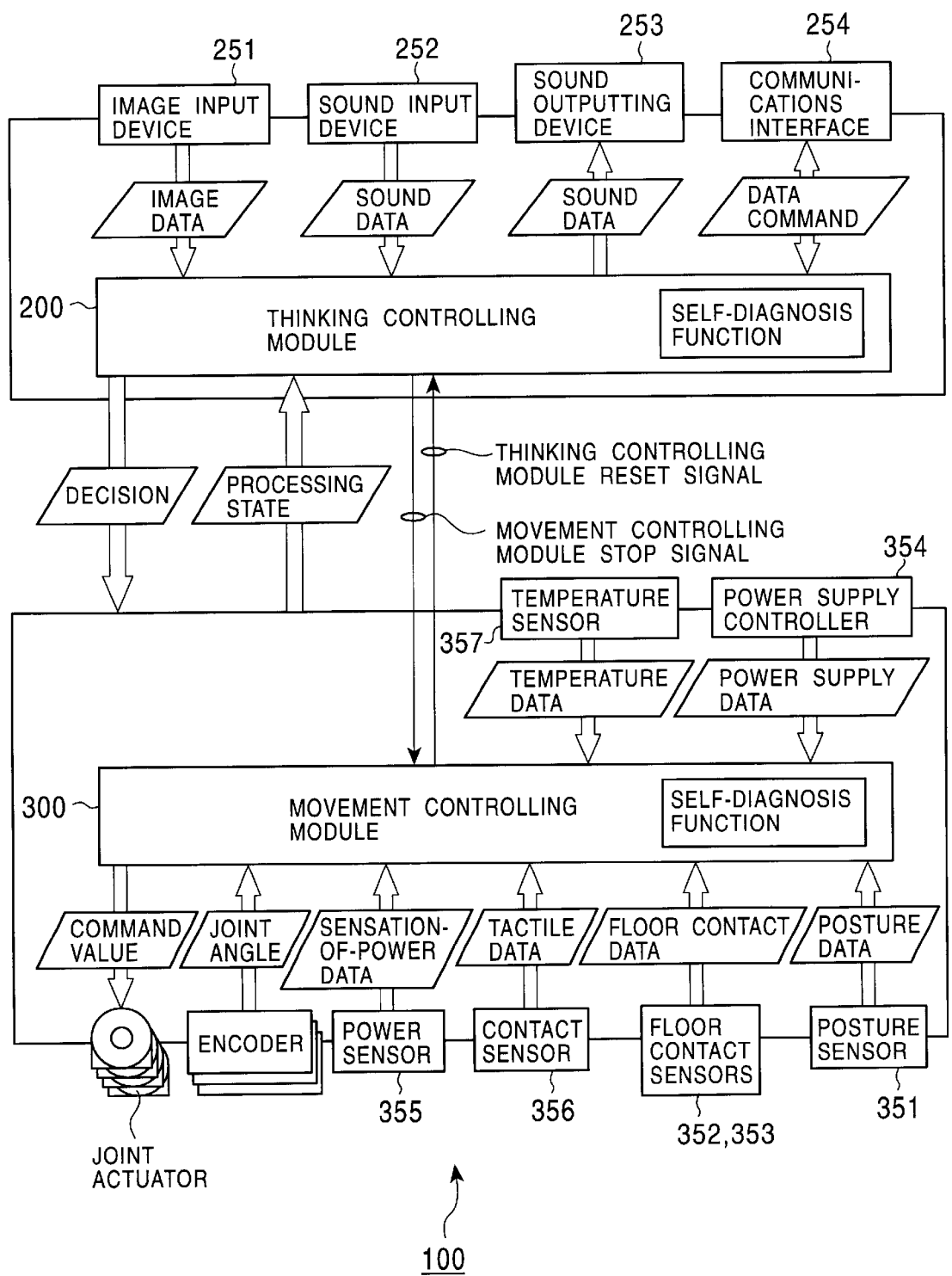
FIG. 5 illustrates a state in which data is transferred between a thinking controlling module 200 and a movement controlling module 300 in the leg-movement-type robot 100.

FIG. 5 illustrates a state in which data is transferred between the thinking controlling module 200 and the movement controlling module 300 in the leg-movement-type robot 100.

The thinking controlling module 200 takes in image data as visual data which is acquired at the image input device 251, and sound data as visual data which is input to the sound input device 252. In accordance with such stimuli from the outside, the present emotions and intentions of the leg-movement-type robot 100 are determined.

In addition to making a decision in accordance with an external stimulus which is directly input to the leg-movement-type robot 100, the thinking controlling module 200 can also determine the present emotions and intentions of the leg-movement-type robot 100 in accordance with data or a command transmitted from an external system through the communications interface 254. In the latter case, a user at a remote place can supply data regarding, for example, the five senses and feelings to the robot 100 through a network or transmit a command to make it possible to prompt the robot 100 to make a decision.

Further, the operation pattern data used at the movement controlling module 300 can be downloaded inside the robot 100 through the communications interface 254 from a server (not shown) on the network.

The thinking controlling module 200 issues a command to the movement controlling module 300 so that the action or conduct based on the decision making, that is, the movement using the four limbs is executed. From the movement controlling module 300, information regarding how far the robot has acted in the commanded manner, that is, information regarding the processing state is returned.

The thinking controlling module 200 not only prompts a movement controlling operation in accordance with the decision made by the module 200 itself, but also can cause sound data which expresses the decision made and the emotions of the robot to be output from the sound outputting device 253.

The thinking controlling module 200 further comprises a self-diagnosis function section. The self-diagnosis function section can determine whether or not an abnormality or failure has occurred at the movement controlling module 300 based on the details of the communication with the movement controlling module 300. More specifically, it determines that an abnormality has occurred when the following have occurred.

(1) A processing state which has nothing to do with the decision issued from the thinking module 200 is returned from the movement controlling module 300.

(2) The movement controlling module 300 does not return a processing state in accordance with the decision within a predetermined time from the issuance of the decision.

(3) The movement controlling module 300 returns a processing state which cannot be understood.

At the movement controlling module 300, the harmonious movement of the whole body is controlled by actuating each of the joint actuators in synchronism with each other, while realizing the action commanded by the thinking controlling module 200. More specifically, in accordance with the specified operation pattern, the movement of the legs, the ZMP (zero moment point) path, the movement of the trunk, the movement of the upper limbs, the horizontal position and height of the waist, etc., are set, and a command value for realizing the operation pattern in accordance with the details of the settings is sent to each of the joint actuators.

From an encoder which is provided at each joint actuator, the rotational angle data of each joint is returned. As a result, the movement controlling module 300 can know the actual displacement amount and displacement speed of each joint. In addition, by subjecting geometrical data concerning, for example, each joint displacement angle and each arm length to a predetermined geometrical computation, the pattern of the actual movement of the whole body of the leg-movement-type robot 100 can be computed.

Detection signals from the posture sensor 351 and the floor contact confirmation sensors 352 and 353 for detecting the contacting of the left and right soles with the floor are input to the movement controlling module 300. Based on these detection signals and the actual operation pattern which has been calculated, the harmonious movement of the whole body of the leg-movement-type robot 100 can be appropriately controlled.

Although not shown in FIG. 4, a power sensor 355, a contact sensor 356, a temperature sensor 357, etc., may be further disposed at predetermined portions of the leg-movement-type robot 100. The movement controlling module 300 can use sensation-of-power data, tactile data, and temperature data taken in from these sensors in order to appropriately perform a controlling operation.

The movement controlling module 300 further comprises a self-diagnosis function section. Based on the details of the communication with the thinking controlling module 200, the self-diagnosis function section can determine whether or not an abnormality or a failure has occurred at the thinking controlling module 200. More specifically, it determines that an abnormality has occurred when the following have occurred.

(1) Decisions are received from the thinking controlling module in an order which violates a predetermined state transition rule.

(2) A decision which cannot be understood based on the predetermined state transition rule is given by the thinking controlling module.

As shown in FIG. 5, hardware control signal lines such as a movement control module stop signal line and a thinking control module reset signal line are provided between the thinking controlling module 200 and the movement controlling module 300. These control signal lines are used when one of the controlling modules finds out that the other controlling module has carried out an abnormal operation.

Figure 6:
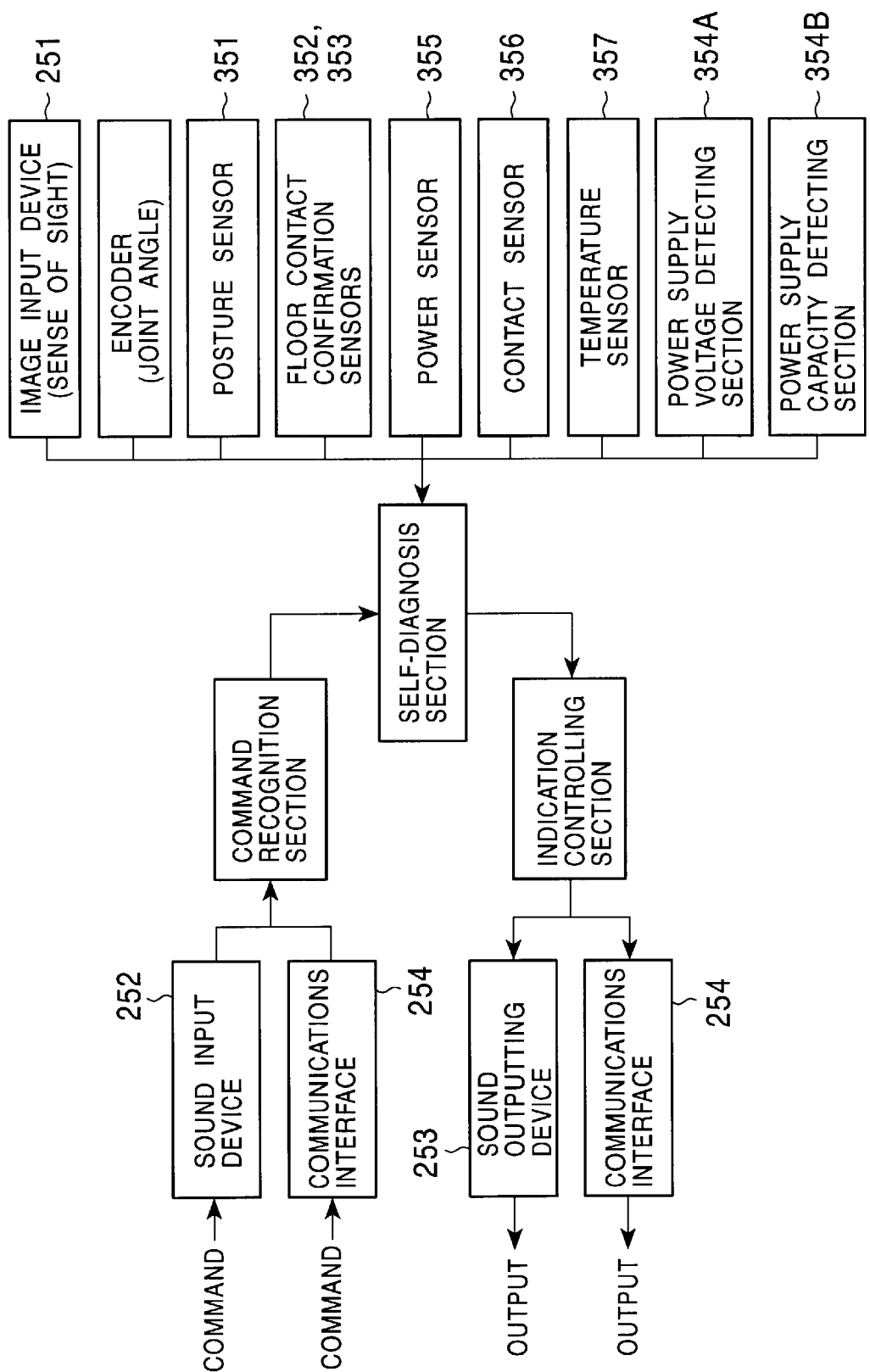
FIG. 6 is a block diagram illustrating a self-diagnosis function which the leg-movement-type robot 100 possesses.

FIG. 6 illustrates a self-diagnosis function which the leg-movement-type robot 100 of the embodiment possesses.

A self-diagnosis section performs a self-diagnosis operation of the condition of the inside of the robot 100 independently or in response to a diagnosis request command from an external device as a result of monitoring, for example, power supply data from a power supply controller 354 and detection output from each of the image input device (visual sensor) 251, the encoder of each joint actuator, the posture sensor 351, the floor contact confirmation sensors 352 and 353, the power sensor 355, and the contact sensor 356. The power supply controller 354 comprises a terminal voltage detecting section 354A for actuating a battery, and a detecting section 354B for detecting the remaining capacity of a battery.

In the leg-movement-type robot 100 of the embodiment, the diagnosis request command is received by a sound input operation or from an external system (not shown) through a network.

In the former case, the sound which is input to the sound input device 252, such as a microphone, from the user is interpreted/recognized by a command recognizing section in order to notify the self-diagnosis section that a request for a diagnosis has been made. For example, the user can input to the robot 100 commands which prompt a self-diagnosis operation in the form of a natural communication, such as by saying, "Perform a self-diagnosis operation," or by asking "How do you feel, robot?"

In the latter case, after a command which is sent from an external system through a network has been received by the communications interface 254 once, the command is interpreted/recognized by the command recognizing section in order to notify the self-diagnosis section that a request for a diagnosis has been made. The external system (not shown) on the network may provide a GUI (graphical user interface) screen used for operating the robot.

In the leg-movement-type robot 100 of the embodiment, the results of the self-diagnosis operation determined by the self-diagnosis section can be indicated/told to the external system, that is, the user. As a result, the user can, for example, perform operations (such as maintenance on the robot 100) based on the diagnosis results.

The self-diagnosis results can be indicated or told by a sound output operation or by transmission to the external system through the network.

In the former case, at an indication control section, sound data which indicates the diagnosis results is generated in order to output sound from the sound outputting device 253, such as a speaker, in order to tell/indicate the diagnosis results to the user. The self-diagnosis results can be indicated in the form of a natural conversation, such as by saying "I'm not feeling well," "My leg hurts," and "I'm hungry."

In the latter case, at the indication control section, a data frame (or packet) in which the diagnosis results are given is generated, and is sent to the external system on the network through the communications interface 254. The external system (not shown) on the network may respond to the reception of the diagnosis results in order to cause a pop-up window which indicates the details of the diagnosis to appear or in order to generate a warning sound.

When, for example, an abnormality is detected at the thinking controlling module 200 as a result of the diagnosis at the self-diagnosis section, the movement controlling module 300 switches to the safest state or "stopping at a standing state" in order to prevent the possibility of the further execution wild operations as a result of receiving an erroneous decision again. In addition, the movement controlling module 300 enables the reset signal of the thinking controlling module 200 in order to reset the thinking controlling module 200. The movement controlling module 300 waits until the thinking controlling module 200 starts operating again and is restored to the normal operation state.

When an abnormality is detected at the movement controlling module 300 as a result of the diagnosis at the self-diagnosis section, the thinking controlling module 200 enables the stop signal of the movement controlling module 300 in order to stop the movement controlling module 300. As a result, it is possible to previously prevent, for example, fire caused when an actuating system, such as a joint actuator, operates wildly due to continued abnormal operations.

An example of the self-diagnosis function which is executed at the self-diagnosis section will now be described.

(1) Joint Angle

With respect to a target joint angle command given to each joint actuator, each piece of current positional information, that is, each joint angle which is fed back from each encoder after positioning by actuation is confirmed in order to record the deviation from each target joint angle. If the deviation exceeds a prescribed amount, a failure diagnosis result indicating "abnormal positioning" is issued.

(2) Measurement of Temperature

A temperature sensor 357 is installed in each joint actuator (or some of the joint actuators which are moved with a high percentage) in order to measure the temperature of the inside of each actuator. Each piece of temperature data is periodically monitored and each value thereof is sequentially recorded. When the temperature exceeds a corresponding prescribed value (or when an unnatural temperature change occurs), a failure diagnosis result indicating "abnormal temperature" is issued.

(3) Supply Voltage

The power supply controller 354 monitors at all times the supply voltage of the battery used for actuation and the supply voltage applied to each of the controlling modules 200 and 300 and each of the joint actuators, and sequentially records the measured values. When a supply voltage greatly exceeds a corresponding prescribed value, a failure diagnosis result indicating "abnormal supply voltage" is issued.

When the supply voltage is less than the corresponding prescribed value, the remaining capacity of the battery may be low (that is, the battery may be in a discharged state). When the supply voltage exceeds the corresponding prescribed value, a wild operation or a controlling circuit failure may occur.

(4) Communications Control

Each joint actuator used in the embodiment is a small AC servo actuator which is directly connected to gears and which incorporates in a motor unit a servo control system formed into a one-chip system (mentioned above). The servo control system of each actuator performs communications with the higher-level movement controlling module 300 in order to receive each actuation command value and to send the output of each encoder.

The movement controlling module 300 always monitors the details of the communications with each joint actuator, and issues a failure diagnosis result indicating "abnormal joint" when it detects an abnormality.

(5) Posture

The output from the posture sensor 351 which is installed at the trunk of the leg-movement-type robot 100 makes it possible to measure the azimuthal angle of each of the pitch axis, the roll axis, and the yaw axis.

In the case where the azimuthal angle of at least the pitch axis, the roll axis, and the yaw axis falls outside a prescribed value while the robot is walking normally, a failure diagnosis result indicating "abnormal posture" is issued.

Even in the case where operations other than normal walking are being executed, when the azimuthal angle of the pitch axis, the roll axis, or the yaw axis falls outside its corresponding prescribed value with respect to the commanded movement posture, a failure diagnosis result indicating "abnormal posture" is issued.

The self-diagnosis section may detect failures or abnormalities based on the output of the image input device 251, the power sensor 355, or the contact sensor 356.

For example, using the image input device 251 as a visual sensor, it is possible to perform a diagnosis based on a piece of object-related information (such as the form, contour, and edges of the object) and the information of the color of the object which have been recognized from the input image.

When the output of either the contact sensor or the power sensor exceeds its corresponding prescribed value, it can, for example, determine that an external force has been applied, and, thus, that an abnormality has occurred.

[Supplement]

The present invention has been described in detail with reference to a particular embodiment. However, it is obvious that modifications and substitutions may be made by those skilled in the art without departing from the gist of the present invention. In other words, the present invention has been described in various forms for illustrative purposes only. Therefore, it is to be understood that the present invention is not limited thereto. In order to determine the gist of the present invention, one should refer to the claims of the present invention at the beginning of this document.

As described in detail above, according to the present invention, it is possible to provide an excellent controlling system of a leg-movement-type robot which can independently perform an actuating operation as a result of installing a controlling device thereat.

According to the present invention, it is possible to provide an excellent controlling system of a leg-movement-type robot which can perform a self-diagnosis operation of a failure or an abnormality in the system, and which can feed back the diagnosis results to the user.

According to the present invention, it is possible to provide a humanoid robot which receives a failure diagnosis command through an excellent, "human-like" user interface, and which can tell the diagnosis results in an easily understandable manner to the user.

According to the present invention, it is possible to provide a movable robot which can independently tell at an early stage that a failure or abnormality has occurred.

What is claimed is:

1. A robot failure diagnosing system which comprises a plurality of joint actuators, the system further comprising:

request input means for inputting a request for a failure diagnosis thereto;

measuring means for measuring the state of at least one of the plurality of joint actuators inside of a robot;

diagnosing means for diagnosing the failure of the robot in response to the request for a failure diagnosis which has been input to the request input means; and diagnosis result outputting means for outputting a failure diagnosis result given by the diagnosing means to anything outside the system.

2. A robot failure diagnosing system according to claim 1, wherein the request input means receives the request through sound.

3. A robot failure diagnosing system according to claim 1, wherein the request input means receives the request from an external system through a communications interface.

4. A robot failure diagnosing system according to claim 1, wherein the measuring means includes an encoder for measuring the angle of each joint actuator; and wherein the diagnosing means diagnoses the failure based on a deviation of each current joint angle output from the encoder from a corresponding target joint angle which is prescribed with respect to each joint actuator.

5. A robot failure diagnosing system according to claim 1, wherein the measuring means includes a temperature sensor for measuring the temperature of the inside of each joint actuator, and wherein the diagnosing means determines that a failure has occurred in each joint actuator when each temperature measured by the temperature sensor exceeds a corresponding prescribed value.

6. A robot failure diagnosing system according to claim 1, wherein the robot is a battery-actuating-type robot, wherein the measuring means includes a supply voltage detecting section for measuring a terminal voltage of a battery or the supply voltage supplied to each joint actuator from the battery, and wherein the diagnosing means determines that a power supply abnormality has occurred when the voltage detected by the supply voltage detecting section falls outside a corresponding prescribed value.

7. A robot failure diagnosing system according to claim 1, wherein the measuring means includes a posture sensor for detecting an azimuthal angle of at least one of a pitch axis, a roll axis, and a yaw axis of the robot, and wherein the diagnosing means determines that an abnormal posture has occurred when the azimuthal angle detected by the posture sensor falls outside a corresponding prescribed value.

8. A robot failure diagnosing system according to claim 1, wherein the measuring means includes an image input device, and wherein the diagnosing means performs a diagnosis based on a result which has been recognized from an input image which is provided at the image input means.

9. A robot failure diagnosing system according to claim 1, wherein the measuring means includes an image input device, and wherein the diagnosing means performs a diagnosis based on a piece of object-related information which has been recognized from an input image which is provided at the image input means.

10. A robot failure diagnosing system according to claim 1, wherein the measuring means includes an image input device, and wherein the diagnosing means performs a diagnosis based on a piece of color information which has been recognized from an input image which is provided at the image input means.

11. A robot failure diagnosing system according to claim 1, wherein the measuring means includes at least one of a contact sensor and a power sensor, and wherein the diagnosing means determines that an abnormality has occurred when the output of either the contact sensor or the power sensor exceeds a prescribed value corresponding thereto.

12. A robot failure diagnosing system according to claim 1, wherein the diagnosis result outputting means outputs the diagnosis result using sound.

13. A robot failure diagnosing system according to claim 1, wherein the diagnosis result outputting means outputs the diagnosis result to an external system through a communications interface.

* * * * *